(12) United States Patent
Bush et al.

(10) Patent No.: US 7,287,087 B1
(45) Date of Patent: Oct. 23, 2007

(54) COMMUNICATIONS NETWORK FOR DYNAMIC REPRIORITIZATION

(75) Inventors: Stephen Francis Bush, Latham, NY (US); John Erik Hershey, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 1477 days.

(21) Appl. No.: 09/697,562

(22) Filed: Oct. 26, 2000

Related U.S. Application Data

(60) Provisional application No. 60/162,901, filed on Nov. 1, 1999.

(51) Int. Cl.
*G06F 15/16* (2006.01)

(52) U.S. Cl. .................. 709/234; 709/232; 709/238; 709/240; 370/412; 370/413

(58) Field of Classification Search ........... 709/234, 709/232, 238, 207, 240; 718/103; 370/412–413, 370/415, 417, 428
See application file for complete search history.

(56) References Cited

U.S. PATENT DOCUMENTS

| | | | | | |
|---|---|---|---|---|---|
| 4,965,716 | A | * | 10/1990 | Sweeney | 710/112 |
| 5,278,898 | A | * | 1/1994 | Cambray et al. | 379/266.1 |
| 5,506,966 | A | * | 4/1996 | Ban | 709/207 |
| 5,867,663 | A | * | 2/1999 | McClure et al. | 709/234 |
| 5,872,929 | A | * | 2/1999 | Naito | 709/223 |
| 5,903,735 | A | * | 5/1999 | Kidder et al. | 709/240 |
| 5,937,205 | A | * | 8/1999 | Mattson et al. | 710/6 |
| 5,974,465 | A | * | 10/1999 | Wong | 709/234 |
| 6,091,709 | A | * | 7/2000 | Harrison et al. | 370/412 |
| 6,115,365 | A | * | 9/2000 | Newberg et al. | 370/412 |
| 6,304,578 | B1 | * | 10/2001 | Fluss | 370/413 |
| 6,324,570 | B1 | * | 11/2001 | Tonchev et al. | 709/207 |
| 6,449,251 | B1 | * | 9/2002 | Awadallah et al. | 370/412 |
| 6,563,836 | B1 | * | 5/2003 | Capps et al. | 370/412 |
| 6,570,876 | B1 | * | 5/2003 | Aimoto | 370/412 |
| 6,629,220 | B1 | * | 9/2003 | Dyer | 711/158 |
| 6,658,485 | B1 | * | 12/2003 | Baber et al. | 718/103 |
| 6,724,766 | B2 | * | 4/2004 | Michiel | 370/412 |

OTHER PUBLICATIONS

J.E. Hershey et al, On Respecting Interdependence Between Queueing Policy and Message Value, Dec. 1999, CRD Class 1 Technical Report.

* cited by examiner

*Primary Examiner*—Philip Tran
(74) *Attorney, Agent, or Firm*—Fletcher Yoder

(57) ABSTRACT

A communications network comprising at least one source unit is configured to generate messages for relay to a portal node through at least one smart node. The smart node includes a dynamic reprioritization controller capable of dynamically reprioritizing the relayed messages prior to relay transmission by a transmitter according to received programming instructions.

14 Claims, 5 Drawing Sheets

COMMUNICATIONS NETWORK FOR DYNAMIC REPRIORITIZATION

CROSS REFERENCE TO RELATED APPLICATIONS

This application claims priority of U.S. provisional application Ser. No. 60/162,901, filed Nov. 1, 1999.

STATEMENT REGARDING FEDERAL SPONSORSHIP

The U.S. Government has a paid-up license in this invention and the right in limited circumstances to require the patent owner to license others on reasonable terms as provided for by the terms of Contract No. F30602-98-C-0230 awarded by the U.S. Air Force.

BACKGROUND OF THE INVENTION

This invention relates to active network management and, more particularly, to active networks having at least one node capable of being programmed to dynamically adjust the individual priorities of messages in queue at that node.

With the growth of electronic messaging, it has become evident that some messages in a communications network are more time critical than others. In recognition of this fact, various priority conventions have been devised so that messages of higher priority can be relayed through the network ahead of messages having a lower priority. Military torn-tape relays, for example, typically employ four or five levels of priority, ranging from low priority to high, with names assigned, such as routine, priority, immediate, and flash. It has heretofore been a general tenet of network operation that once a priority is assigned to a message, then, almost without exception, the assigned priority remains invariant over the lifetime of the message in transit through the communications network.

As the potential for modern warfare has evolved, traditional methods of message prioritization are proving inadequate to satisfy the data communication demands of many modern warfare scenarios. A further complication is introduced by the requirement that the data communications network must degrade gracefully (i.e., not abruptly) if the network suffers occasional and cumulative damage incident to active hostilities. The combination of increasing data demands and degraded network throughput capacity constitute motivation for devising a new data communications architecture and concomitant operating procedures for the following two reasons:

1. Various classes of data messages have value, or utility, that changes with time. In situations where capacity becomes stressed or degraded to the point that the expected stay of a message in queue is significant compared to the time scale of its value dynamics, there is a need to consider reprioritization. Further, the value, or utility, of a message is often not intrinsic but rather depends upon other messages.

2. Data communication cannot be practiced by itself, in a vacuum so to speak. Rather, it must be crafted as the function of a coequal system with computation. Since the two are often inextricably linked, optimization must involve synergy through their linkage.

BRIEF SUMMARY OF THE INVENTION

In accordance with a preferred embodiment of the invention, a communications network comprises at least one source unit configured to generate messages for relay, a "smart" node, and at least one portal node. The smart node is capable of storing programming instructions, receiving messages for relay from the source unit, dynamically reprioritizing the received messages for relay, and transmitting the reprioritized received messages. The at least one portal node is adapted to receive the reprioritized received messages transmitted from the smart node.

DETAILED DESCRIPTION OF THE INVENTION

Figure 1:
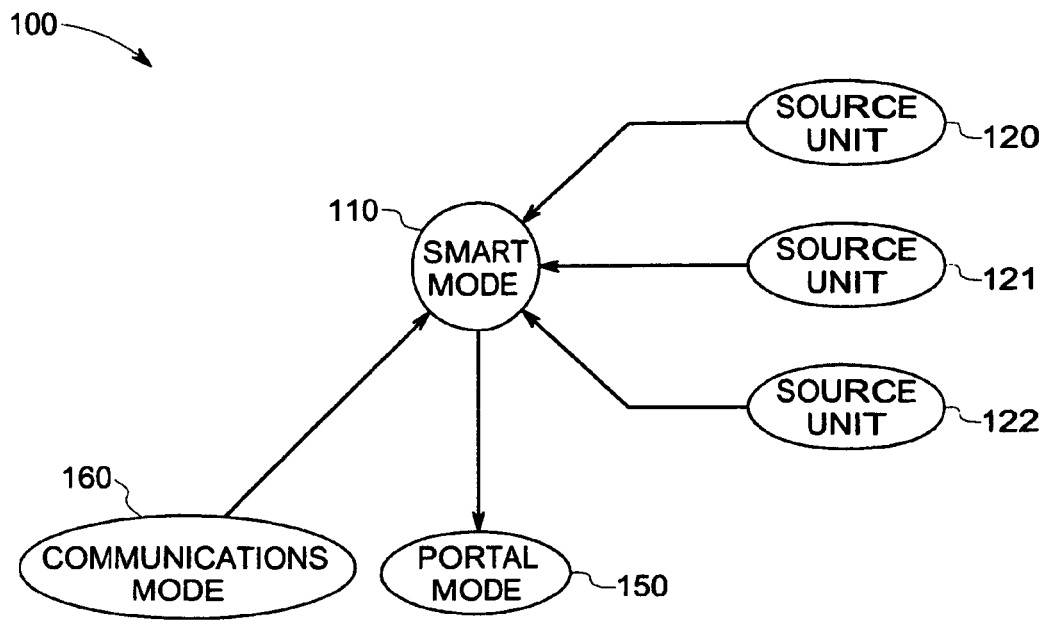
FIG. 1 is a schematic illustration of a communications network capable of performing dynamic reprioritization of received messages.

In FIG. 1, a preferred embodiment of a communications network 100 capable of dynamic reprioritization of messages is shown composed of one or more source units, such as source units 120, 121, 122, that generate messages for relay and send them to a smart node 110, i.e., a node that actively manipulates the order in which the messages are retransmitted. Thus, node 110 receives the messages for relay from the source units, stores the messages for relay in queue, reprioritizes the messages for relay for retransmission according to programmed instructions, and transmits the messages for relay to a portal node 150 that may comprise a relay node or a gateway to another communications system. The smart node receives the programmed instructions from a communications node 160. The programmed instructions may be communicated to the smart node via an active network paradigm which is a programmable communications infrastructure using a well-defined structure for packets that contain general-purpose program code and a uniform standardization execution platform at some of the network nodes.

Figure 2:
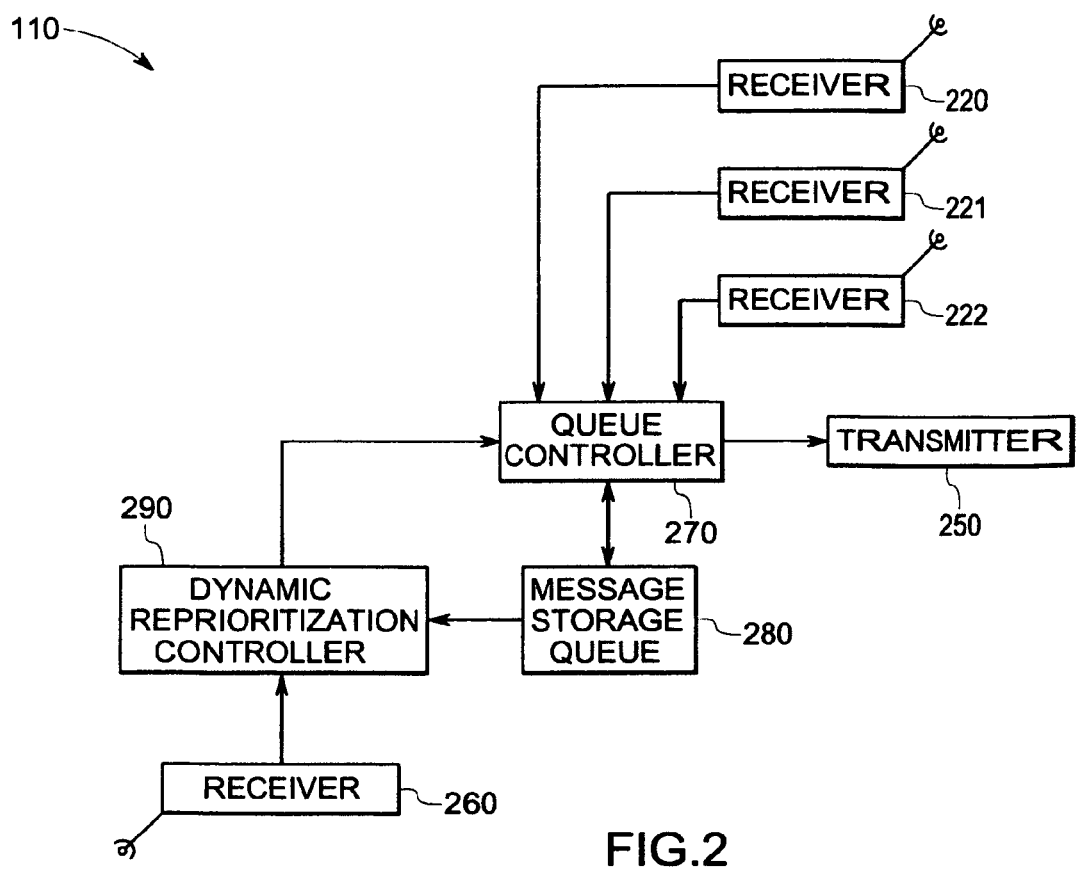
FIG. 2 is a block diagram of a smart node in a communications network, capable of dynamic reprioritization of messages.

FIG. 2 illustrates the components of smart node 110. Receivers 220, 221, 222 receive the messages for relay. A queue controller 270 writes the received messages for relay into a message storage queue 280 and removes messages for relay from the message storage queue for relay transmission by a transmitter 250. Receiver 260 receives programming instructions from a ground control station, for example, for dynamic reprioritization. These instructions may be in the form of active messages carrying computer code to be executed in a dynamic reprioritization controller 290 of smart node 110. Dynamic reprioritization controller 290 inspects the messages for relay that are stored in message storage queue 280 and specifies the order of transmission to a queue controller 270.

Figure 3:
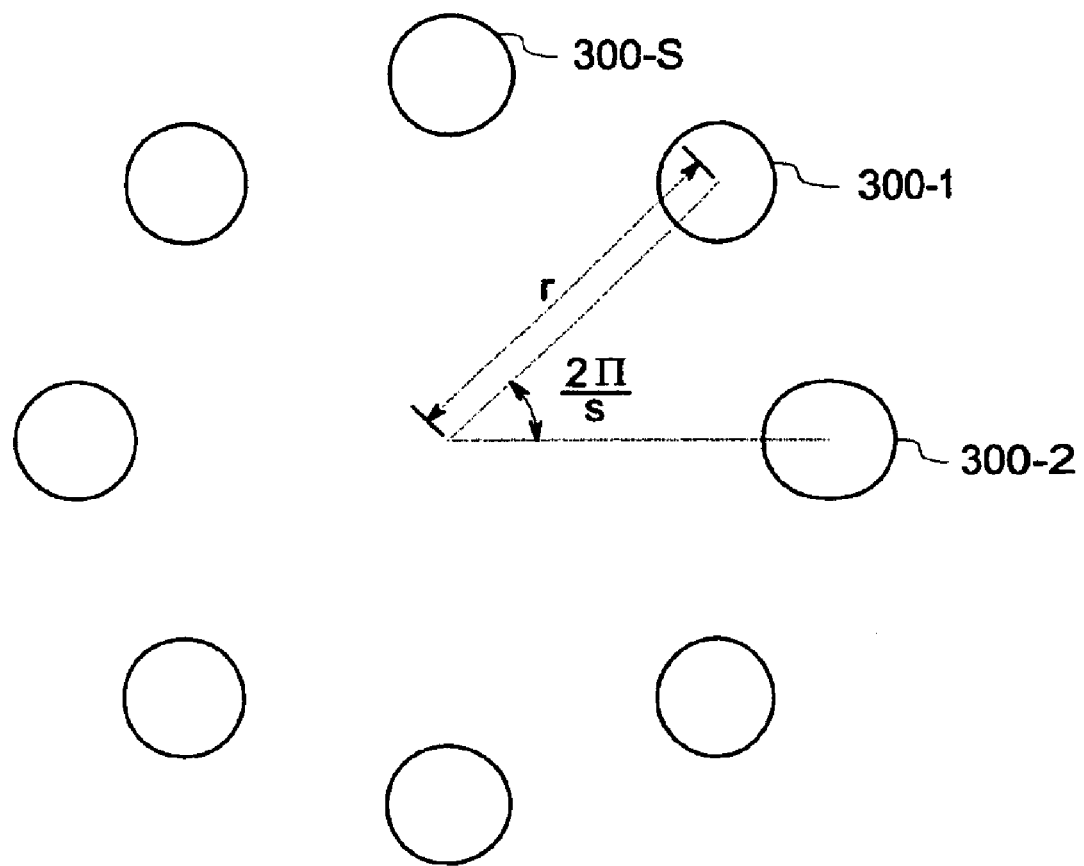
FIG. 3 is a schematic diagram of eight ground based optical sensors which will function as the source units generating messages for relay through a communications network supporting the collection, dynamic reprioritization, and transmission of messages.

By way of example, dynamic reprioritization for the militarily relevant use of sensor fusion is considered in accordance with FIG. 3. A plurality of S ground based optical sensors 300-1, 300-2, . . . , 300-S measure the direction cosines of targets as they appear in an area of sky above them. The sensors are arranged in a circle and, for this example, S=8. Each sensor is able to tie its specific observation to a particular target and send this observation in message to a smart node for reprioritization. In this example, the smart node might be located at a geostationary satellite that relays the observation messages to a weapons control-processing center.

In this example, the target locations are estimated and a directed energy (DE) weapon is issued against them. The probability that the DE weapon will be effective on any particular firing is a strong function of the merit of the individual target location estimate. The greater the volume of uncertainty within which the target is to be found, the greater the number of weapon commitments, or, equivalently, DE firings, is necessary to neutralize that target. The number of targets in a real situation may be quite large and the number of objects in the target field very large due to shroud components, tank fragmentation and so on as taught by E. W. Reed, E. C. Henry, and A. Crosby in their article "THAAD System Loading Capacity Evaluation in Anticipated Tactical Field Environments" published in the *Proceedings of Radar 97*, 1997, pp. 352-355, and by D. E. Mosher in his article "The Grand Plans" published in *IEEE Spectrum*, September 1997, pp. 28-39.

The calculus of choice for comparing the relative merits of individual target location estimates is the Position Dilution of Precision, or PDOP. The PDOP for an individual target is computed by taking the square root of the trace of the matrix $(H^T H)^{-1}$ where H is a matrix of the direction cosines of an individual target measured from the sensors and T signifies transpose. For the instant example, $$H = \begin{pmatrix} a_{x,1} & a_{y,1} & a_{z,1} \\ a_{x,2} & a_{y,2} & a_{z,2} \\ \vdots & \vdots & \vdots \\ a_{z,S} & a_{z,S} & a_{z,S} \end{pmatrix}$$

where $(a_{x,i}, a_{y,i}, a_{z,i})$ are the direction cosines of the target measured from sensor i. The smaller the value of the PDOP for a particular set of sensors and particular target, the higher the merit of the particular target location estimate. Merit may thus be defined as 1/PDOP. At a minimum, three sensors are required to triangulate a target based on its measured direction cosines.

Figure 4:
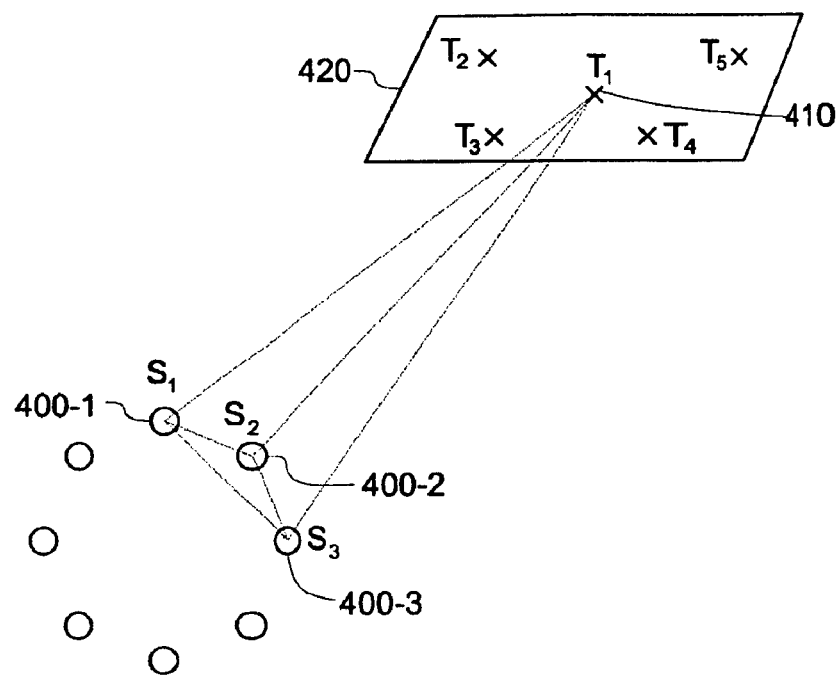
FIG. 4 is a schematic illustration of a situation wherein three sensors provide a baseline for target position estimation that will exhibit a relatively high PDOP (position dilution of precision) and consequently a relatively low merit estimation of target location.

FIG. 4 is an illustration of the case geometry wherein three sensors 400-1, 400-2, 400-3 are each reporting the measured direction cosines of the same target 410 in a target field 420. In the case geometry of this situation, wherein the three sensors form a relatively small solid angle with respect to the target, the PDOP, based on the information from the three sensors, will be relatively large and consequently the target location estimate will be of limited merit.

Figure 5:
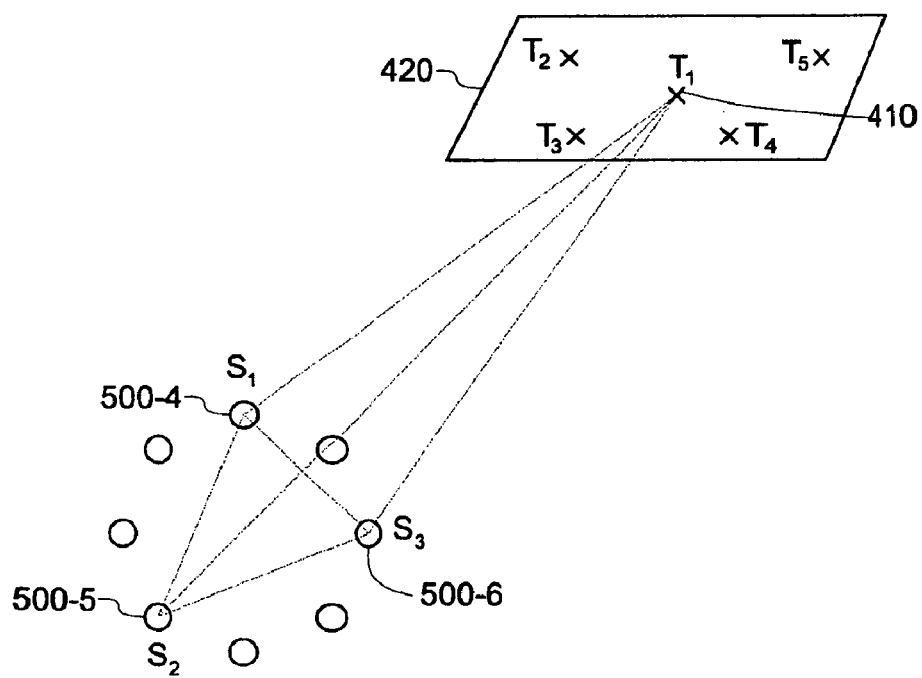
FIG. 5 is a schematic illustration of a situation wherein three sensors provide a baseline for target position estimation that will exhibit a relatively low PDOP and consequently a relatively high merit estimation of target location.

FIG. 5 is also an illustration of the case geometry wherein three sensors 500-4, 500-5, 500-6 are each reporting the measured direction cosines of the same target 410 in a target field 420. In the case geometry of this situation, wherein the three sensors form a relatively large solid angle with respect to the target, the PDOP, based on the information from the three sensors, will be relatively small and consequently the target location estimate will be of greater merit.

Two situations were simulated involving S=10 sensors reporting on a target through a single relay point, which might be a geostationary satellite that stores the measurements in an on-board queue and then sends the measurements on to a single data sink for further processing, such as weapons allocation and battle management. In one situation, that of No Reprioritization, the reports of the sensors were forwarded with no particular ordering. For the other situation, Reprioritization According to a Simple Heuristic, the messages were reprioritized according to a simple heuristic in order to improve the PDOP of a particular target and also to reduce the variation in PDOP as the target location was sequentially refined. Because it is desirable to avoid a computationally intensive effort such as would be involved in calculating $(H^T H)^{-1}$, a simple heuristic was used to do this. Specifically, the first three relayed measurements for any particular target were such that they were from sensors that were well distributed around the circle of sensors, i.e., three sensors separated from each other by about 120°. This, of course, is indeed an example of a scenario wherein a single message has no well defined priority but whose priority is defined in relation to other messages in queue.

Figure 6:
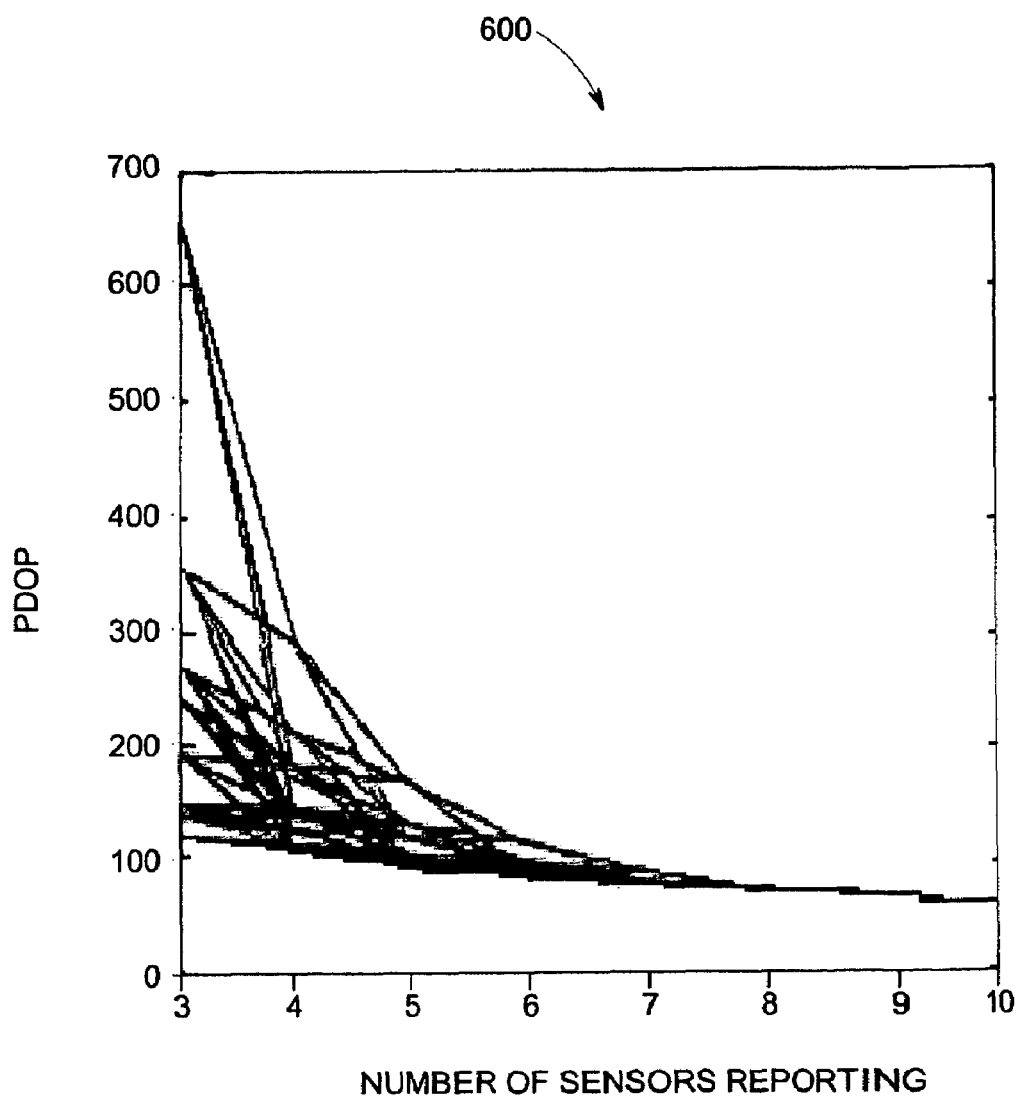
FIG. 6 is a graph of the results based on the target position estimation of the FIG. 4 situation simulating no reprioritization.

FIG. 6 depicts the results of the simulation of No Reprioritization. Because reprioritization often results in an initial PDOP of relatively low merit, there is often a marked variation in the PDOP as the ten sensor measurements are sequentially fused as displayed in graph 600.

Figure 7:
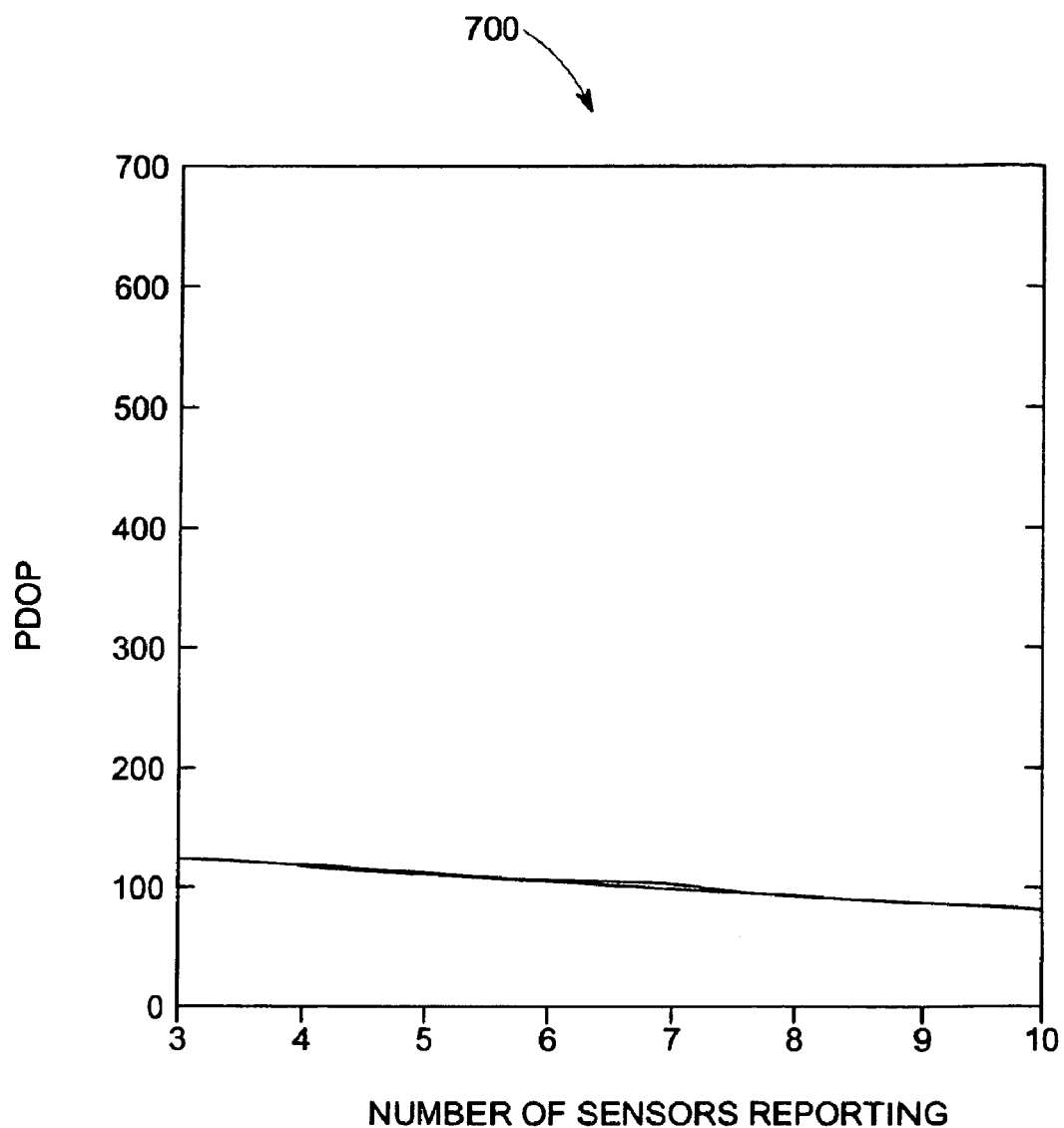
FIG. 7 is a graph of the results based on the target position estimation of the FIG. 5 situation simulating prioritization using a computationally simple heuristic.

FIG. 7 depicts the results of the simulation of Reprioritization According to a Simple Heuristic. Because reprioritization based on the simple heuristic results in an initial PDOP of relatively high merit initially, there is often a marked reduction in variation in the PDOP as the ten sensor measurements are sequentially fused as displayed in graph 700.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A communications network, comprising:
   at least one source unit configured to generate messages for relay;
   a smart node capable of storing programming instructions, receiving messages for relay from said source unit, determining at least a merit value for said received messages, dynamically reprioritizing the received messages for relay based upon said merit value, and transmitting the reprioritized received messages; and
   at least one portal node adapted to receive said reprioritized received messages transmitted from said smart node.

2. The communications network as specified in claim 1, wherein said smart node comprises an electronic computer for executing said programming instructions.

3. The communications network of claim 1, wherein said programming instructions comprise active messages.

4. A communications network, comprising:
- at least one source unit configured to generate messages for relay;
- a smart node capable of receiving programming instructions, storing said programming instructions, receiving messages for relay from said source unit, storing the received messages for relay in a queue, determining at least a merit value for said received messages, and dynamically reprioritizing the received messages for relay in said queue based upon said merit value;
- at least one portal node adapted to receive said retransmitted received messages from said at least one smart node for relay; and
- at least one communications node adapted to send said programming instructions to said smart node.

5. The communications network of claim 4, wherein said smart node comprises:
- a message storage queue;
- a transmitter;
- a receiver;
- a queue controller for writing messages received at said smart node into said message storage queue and for removing messages from said message storage queue for relay transmission by said transmitter; and
- a dynamic reprioritization controller for specifying an order of transmission of said removed messages for relay transmission by said transmitter.

6. The communications network of claim 5, including at least one receiver for receiving said messages for relay from said source unit.

7. The communications network of claim 2, wherein said merit value for said received messages is determined heuristically.

8. The communications network of claim 4, wherein said merit value for said received messages is determined heuristically.

9. A method for dynamic reprioritizing messages, comprising:
- receiving messages from a source unit;
- storing said received messages in a buffer unit;
- determining a merit value for said received messages;
- reprioritizing said received messages based upon said merit value; and
- transmitting the reprioritized received messages.

10. The method of claim 9, wherein said merit value for said received messages is determined heuristically.

11. The method of claim 9, wherein said received messages are stored in a queue.

12. The method of claim 9, wherein a smart node reprioritizes said received messages.

13. The method of claim 12, wherein said smart node transmits said reprioritized received messages.

14. The method of claim 12, wherein said smart node receives programmable instructions from a communication node.

* * * * *